US010500131B2

(12) United States Patent
Jacobs (10) Patent No.: US 10,500,131 B2
(45) Date of Patent: Dec. 10, 2019

(54) PILL SPEED AND POSITION SENSOR (71) Applicant: PerceptiMed, Inc., Mountain View, CA (US)

(72) Inventor: Alan Jacobs, Palo Alto, CA (US)

(73) Assignee: PerceptiMed, Inc., Mountain View, CA (US)

( * ) Notice: Subject to any disclaimer, the term of this patent is extended or adjusted under 35 U.S.C. 154(b) by 0 days.

(21) Appl. No.: 15/502,157

(22) PCT Filed: Aug. 8, 2014

(86) PCT No.: PCT/US2014/050439
§ 371 (c)(1),
(2) Date: Feb. 6, 2017

(87) PCT Pub. No.: WO2016/022158
PCT Pub. Date: Feb. 11, 2016

(65) Prior Publication Data
US 2017/0224585 A1   Aug. 10, 2017

(51) Int. Cl.
*G06Q 50/00* (2012.01)
*H04N 7/18* (2006.01)
(Continued)

(52) U.S. Cl.
CPC . *A61J 1/03* (2013.01); *A61J 7/02* (2013.01); *G01P 3/68* (2013.01); *G01V 8/20* (2013.01);
(Continued)

(58) Field of Classification Search
CPC .. G06F 19/3462; G06F 17/0092; H04N 7/188
See application file for complete search history.

(56) References Cited

U.S. PATENT DOCUMENTS 4,418,999 A   12/1983   Baxter
4,563,005 A   1/1986   Hand et al.
(Continued)

FOREIGN PATENT DOCUMENTS

CN   101825725 A   9/2010
CN   103025301 A   4/2013
(Continued)

OTHER PUBLICATIONS

Canadian First Office Action, Canadian Application No. 2,957,202, dated Dec. 15, 2017, 5 pages.
(Continued)

*Primary Examiner* — Rebecca A Volentine
(74) *Attorney, Agent, or Firm* — Fenwick & West LLP (57) ABSTRACT

A speed sensor determines the velocity of an object. A first detector detects light emitted by a first emitter. The first detector includes multiple photodetectors connected in series. The photodetectors produce a current that is proportional to the amount of light incident to the photodetector. The first detector additionally includes a current-to-voltage converter and a threshold detector. The current-to-voltage converter converts the current produced by the photodetectors into a voltage and the threshold detector compares the voltage generated by the current-to-voltage converter with a threshold voltage. When an object passes in between the emitter and any of the photodetectors, the light incident to the photodetector is at least partially blocked, reducing the current produced by the photodetector. Any sufficient reduction in current that reduces the voltage generated by the current-to-voltage converter below the threshold of the threshold detector is quickly registered as an output signal of the threshold detector.

19 Claims, 6 Drawing Sheets (51) Int. Cl.
*A61J 1/03* (2006.01)
*A61J 7/02* (2006.01)
*G01V 8/20* (2006.01)
*G01P 3/68* (2006.01)
*G03B 15/00* (2006.01)
*G03B 17/38* (2006.01)
*H04N 5/225* (2006.01)

(52) U.S. Cl.
CPC ............. *G03B 15/00* (2013.01); *G03B 17/38* (2013.01); *H04N 5/2256* (2013.01); *H04N 7/183* (2013.01)

(56) References Cited

U.S. PATENT DOCUMENTS

| | | | |
|---|---|---|---|
| 5,198,661 | A | 3/1993 | Anderson et al. |
| 5,659,396 | A | 8/1997 | Mondie |
| 5,739,526 | A | 4/1998 | Furstenau et al. |
| 5,862,844 | A | 1/1999 | Perrin |
| 6,693,271 | B2 | 2/2004 | O'Connor et al. |
| 7,570,786 | B2 | 8/2009 | Ateya |
| 8,242,476 | B2 | 8/2012 | Mineault et al. |
| 8,350,208 | B1 | 1/2013 | Zhang et al. |
| 9,940,439 | B2 * | 4/2018 | Royaee ................. G16H 20/13 |
| 2002/0190195 | A1 | 12/2002 | O'Connor et al. |
| 2006/0011642 | A1 | 1/2006 | Mason et al. |
| 2006/0124656 | A1 * | 6/2006 | Popovich, Jr. ........... G07F 9/026 221/9 |
| 2008/0204704 | A1 | 8/2008 | Rankin et al. |
| 2009/0122298 | A1 | 5/2009 | Oron et al. |
| 2010/0224761 | A1 | 9/2010 | Daio |
| 2011/0205521 | A1 * | 8/2011 | Mimeault ............. G01S 7/4814 356/4.01 |
| 2012/0330684 | A1 | 12/2012 | Jacobs et al. |
| 2014/0097195 | A1 * | 4/2014 | Anthony ............. G06F 19/3462 221/13 |
| 2016/0044296 | A1 * | 2/2016 | Sun ..................... G01S 7/4863 348/46 |

FOREIGN PATENT DOCUMENTS

| | | |
|---|---|---|
| DE | 25 38 275 A1 | 10/1976 |
| DE | 32 31 830 A1 | 3/1983 |
| DE | 44 16 559 A1 | 11/1995 |
| DE | 10 2012 006529 A1 | 10/2013 |
| EP | 1 843 176 A1 | 10/2007 |
| JP | S 47-037854 A | 12/1972 |
| JP | S 49-89578 A | 8/1974 |
| JP | S 62-232572 A | 10/1987 |
| JP | H 05-87946 A | 4/1993 |
| JP | H 07-63521 A | 3/1995 |
| JP | 2013-529095 A | 7/2013 |
| WO | WO 2011/112606 A1 | 9/2011 |

OTHER PUBLICATIONS

Patent Cooperation Treaty, International Search Report and Written Opinion of the International Searching Authority, International Patent Application No. PCT/US2014/050439, dated Dec. 16, 2014, 11 Pages.

U.S. Appl. No. 61/311,900, Mar. 9, 2011, Inventor: Alan Jeffrey Jacobs et al.

China National Intellectual Property Administration, First Office Action, CN Patent Application No. 2014800810878, dated May 28, 2019, 17 pages.

* cited by examiner

PILL SPEED AND POSITION SENSOR

BACKGROUND OF THE INVENTION

This disclosure relates generally to a speed sensor, and more specifically to determining the speed of a moving object, such as a pill.

There are many occasions when the speed of an object is desired. For instance, a pitcher in baseball may want to know how fast he is throwing a baseball or a police officer may want to know the speed of a car passing though a freeway. Different applications impose different requirements of the speed sensor. For instance a speed sensor used by a baseball pitcher may allow for a relatively long lag time to output the speed of the baseball, whereas a police officer may benefit by using a speed sensor with a shorter lag time.

Certain applications in which the exact location of the object passing by is not known ahead of time may benefit from having a speed sensor with faster reading times. For example, speed sensors may also be used as part of an automated medication and dosage system, in which pills must be identified and confirmed as the intended pill for a patient. In an example system, a pill to be identified passes through a chute for imaging. A particular challenge of automated identification of pills is to determine when the pill will be in the field of view of a camera used for capturing images of the pills to be identified. The lag time of a speed sensor between object detection and speed determination affects the required distance between the speed sensor and the camera, as well as the accuracy of predictions of when the pill will be within the field of view. Therefore the automated medication and dosage system may benefit from faster sensors since the determination of the speed and position of the pill is performed before the pill crosses the field of view of the camera.

SUMMARY

A speed sensor is used to determine the speed of objects traveling down a path. The speed sensor includes position sensors for sensing the presence of an object. In one embodiment, at least two position sensors are used to sense passage of the object at each sensor. By determining the time between the position sensors and the length of time that the object is sensed, the speed sensor determines the length of the object and its speed.

In one embodiment, the position sensors are emitter-detector pairs. Each emitter-detector pair includes an emitter that emits light and a detector that detects the emitted light. The detector includes multiple photodetectors connected in series, forming a photodetector array, a current-to-voltage converter, and a threshold detector. Each photodetector generates electrical current proportional to the amount of light received by the photodetector. When at least one of the photodetectors is blocked from receiving light emitted by the emitter, the current generated by the photodetectors is interrupted, which causes a decrease in the current at the output of the photodetector array.

The current-to-voltage converter that receives as an input the current generated by the photodetector array and outputs a voltage proportional to the received current. The threshold detector that receives the voltage output of the current-to-voltage converter and determines whether the voltage is higher than a threshold. When an object passes a photodetector in the array, the object occludes the photodetector, which reduces the current from the photodetector array and causes the voltage output to drop under the threshold. As a result, an object passing the photodetector array can be detected without determining the current output of each photodetector individually. This permits fast sensing of an object passing the position sensor, reducing lag time between object passage and calculation of features related to the object, such as the object's speed, position or length.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A speed sensor determines the speed of an object (e.g., pills, which can include any type of pill, tablet, capsule, or other pharmaceutical composition) using at least two sensors that identify when the object passes each sensor. The speed sensor determines the speed of the object by determining the amount of time elapsed between when a first sensor is triggered by the object and a second sensor is triggered by the object.

Certain systems may benefit from knowing the speed of an object passing through the system. For instance, an imaging system that captures images of moving objects may benefit from knowing how fast those objects are traveling, and therefore be able to predict when those objects will be in the field of view of the camera capturing the images.

In one embodiment, the speed sensor is part of a pill dispensing and/or verification system. One example of such a system is disclosed in International Patent Application No. PCT/US2011/027586, filed on Mar. 8, 2011, which claims priority to U.S. Provisional Application No. 61/311,900, filed on Mar. 9, 2011, each of which is hereby incorporated herein in its entirety. Other systems for dispensing and/or verification can also be used or the speed sensor can be used independent of such a dispensing and/or verification system. In an example pill dispensing and verification system, the speed sensor is used to determine a speed of a pill as the pill travels through a chute. The pill dispensing and verification system includes one or more cameras to image the pill, and the speed sensor is used to determine the timing at which the cameras are triggered to capture the image of the pill. In one use of the pill images, the images are provided to an image classification system to determine whether the pill images match the characteristics of pills in a database.

Figure 1A:
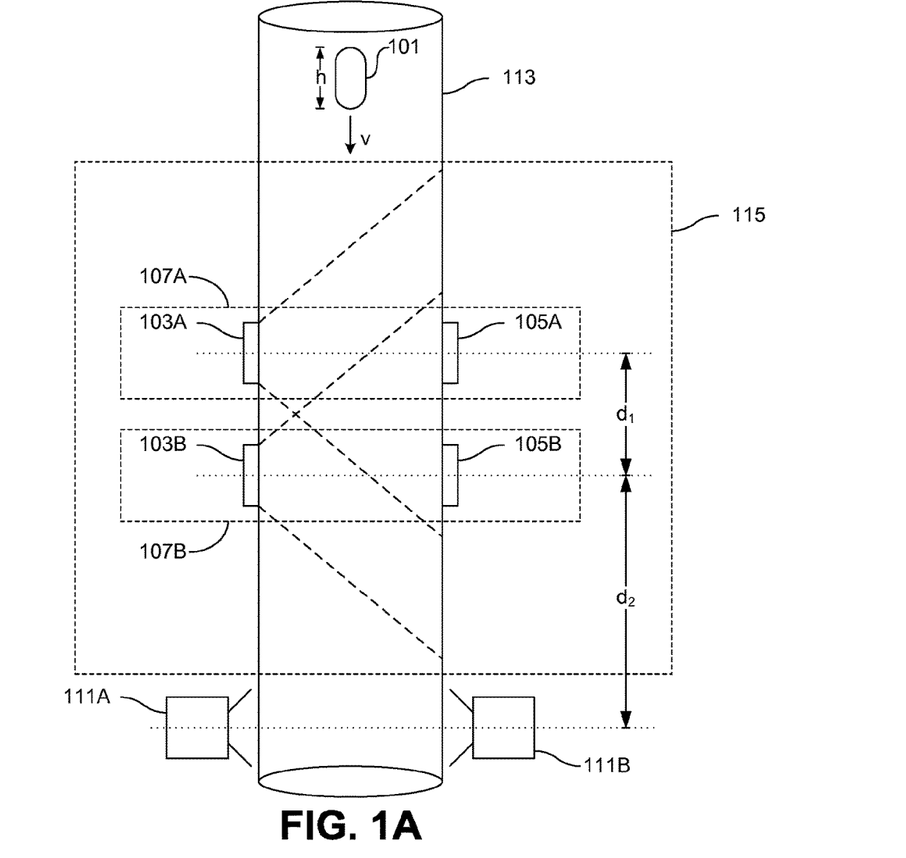
FIG. 1A shows a conceptual view of a speed sensor in an example pill verification system according to one embodiment

FIG. 1A shows a conceptual view of a speed sensor 115 in an example pill verification system according to one embodiment. A pill 101 travels down a tube 113 or pathway during the imaging process. Tube 113 is just one example of a pathway for travel of the pill, but any other pathway, including one that does not include a tube, can be used as well. The tube 113 is typically clear and enables a set of cameras 111 to have an unobstructed view of the pill 101. The tube 113 may be configured to at least partially orient the pill to reduce the variation among pill images. In one embodiment, the tube 113 is square and at a vertically slanted angle to encourage the pill to slide along a flat side of the pill, rather than freefall along any angle. The cameras 111 capture images of the pill 101 as the pill passes through the tube 113. The speed of the pill 101 as determined by the speed sensor 115 is used to determine the image timing of the cameras 111, permitting a centered image of the pill 101 despite the pill's motion through the tube 113. To capture an image of the pill 101 in motion, the cameras 111 are timed using the speed of the pill determined by the speed sensor 115.

The pill verification system determines when the pill 101 will be in the field of view of the cameras 111 using the speed sensor 115. The speed sensor 115 determines the velocity v, and the height h of the pill 101 and calculates the amount of time it takes for the pill 101 to be in the field of view of the cameras 111.

The speed sensor 115 includes a top emitter-detector pair 107A and a bottom emitter-detector pair 107B. The top emitter-detector pair 107 includes a top emitter 103A and a top detector 105A. The bottom emitter-detector pair 107B includes a bottom emitter 103B and a bottom detector 105B. The emitter-detector pairs 107 use matching emission and detection techniques for a transmission method. For example, the emitters 103 may be light emitting diodes (LED) or laser diodes, and may emit monochromatic light or light with more than one wavelength. In some embodiments each emitter (e.g., top emitter 103A and bottom emitter 103B) uses different transmission methods.

Each detector 105 matches the transmission method of the corresponding emitter 103 and is configured to receive and detect that transmission method. Top detector 105A detects when an object (e.g., a pill) has passed in between the top emitter 103A and the top detector 105A. Bottom detector 105B detects when an object (e.g., a pill) passes in between the bottom emitter 103B and the bottom detector 105B. When an object passes in between an emitter 103 and detector 105, the light emitted by the emitter 103 is blocked (or partially blocked) by the object from reaching the detector 105. The detector 105 detects a change in the amount of light reaching the detector and determines whether an object is in between the emitter 103 and the detector 105 based on the amount of light reaching the detector 105. In some embodiments, sensors other than an emitter-detector pair 107 may be used to detect the presence of an object at a specific location of the tube 113.

Figure 1B:
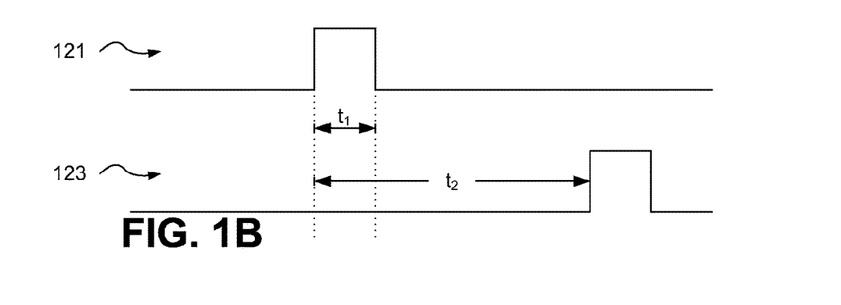
FIG. 1B illustrates an output of a top detector and an output of the bottom detector as a function of time.

FIG. 1B illustrates an output 121 of the top detector 105A and an output 123 of the bottom detector 105B as a function of time. When the pill 101 is not in between an emitter 103 and a detector 105, the light emitted by the emitter is able to reach the detector. As a result, the detector produces an output signal at an inactive voltage level (e.g., logic state low). When the pill 101 is in between the emitter 103 and the detector 105, the light emitted by the detector is not able to reach the emitter. As a result the detector produces an output signal at an active voltage level (e.g., logic state high). As illustrated in FIG. 1B, both detector output signals 121, 123 are at an inactive voltage level. When the pill 101 crosses in between the top detector 105A and the top emitter 103A, the top detector output signal 121 switches to an active state. The top detector output signal 121 remains in the active voltage level until the pill 101 finishes crossing the region in between the top emitter 103A and the top detector 105A. The speed sensor 115 then determines the time duration ($t_1$) elapsed since the top detector signal 121 switched from an inactive signal level to an active signal level and up until the top detector signal 121 switched from the active signal level back to an inactive signal level.

Similarly, when the pill 101 crosses in between the bottom emitter 103B and the bottom detector 105B, the bottom detector output signal switches from an inactive signal level to an active signal level. The speed sensor then determines a gap time ($t_2$) that elapsed since the top detector output signal 121 switched from an inactive signal level to an active signal level and up until the bottom detector output signal 123 switched from an inactive signal level to an active signal level.

The speed sensor 115 determines the velocity of the pill 101 by determining the gap time ($t_2$) elapsed since the top detector 105A detected an object blocking the top emitter 103A until the bottom detector 105B detected an object blocking the bottom emitter 103B. Then, the velocity (v) of the pill 101 can be calculated as:

$$v = \frac{d_1}{t_2}$$

where $d_1$ is the distance between the top detector 105A and the bottom detector 105B and $t_2$ is the gap time between detecting the object at the top detector 105A and the bottom detector 105B.

The speed sensor 115 may also determine the height of the pill 101 by determining the time duration ($t_1$) elapsed since the top detector 105A detected an object blocking the top emitter 103 until the top detector 105A detects that the object stopped blocking the top emitter 103A. Then, the height of the pill 101 can be calculated as:

$$h = v \times t_1$$

where v is the velocity of the pill and $t_1$ is the time duration that the top detector 105A detects the pill.

Based on the velocity v of the pill 101 and the height h of the pill 101, the pill verification system can determine a delay ($t_{capture}$) since the bottom detector 105B detected the pill 101 until the cameras 111 should be triggered to capture the image of the pill 101. For instance, if the acceleration of the pill is negligible, the delay can be calculated as:

$$t_{capture} = \frac{d_2 + 0.5 h}{v}$$

wherein $d_2$ is the distance between the bottom detector 105B and cameras 111, h is the height of the pill 101, and v is the velocity of the pill 101.

In some embodiments, to reduce the change in velocity of the pill 101 due to gravity, since the pill 101 is detected by the top detector 105A until the cameras 111 take a picture of the pill 101, the distance $d_1$ between the top detector 105A and the bottom detector 105B, and the distance $d_2$ between the bottom detector 105B and the cameras 111 are chosen to be smaller than a threshold value. If $d_1$ and $d_2$ are chosen to be within the threshold value, the motion of the pill 101 can be approximated to be of constant velocity. Otherwise, the speed sensor 115 may need to account for additional parameters such as gravity and air resistance, to be able to determine when the pill 101 will be in the field of view of the cameras 111.

Figure 2A:
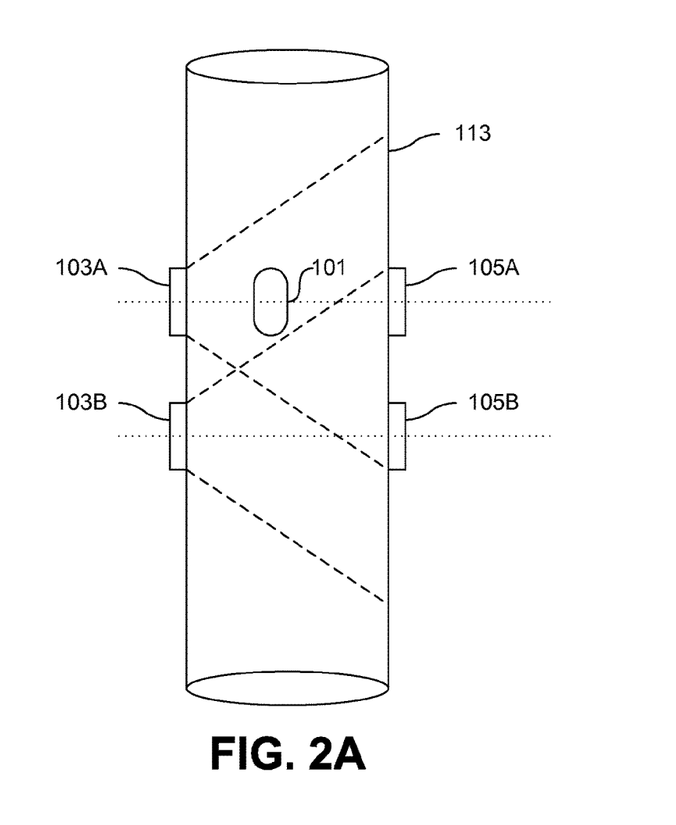
FIG. 2A shows potential interference between emitter-detector pairs according to one embodiment.

FIG. 2A shows potential interference between emitter-detector pairs according to one embodiment. As $d_1$ decreases, the interference between the bottom emitter 103B and the top detector 105A, and the interference between the top emitter 103A and the bottom detector 105B increases. As illustrated in FIG. 2A, as the pill 101 passes in between top emitter 103A and top detector 105A, the pill 101 blocks the light emitted by top emitter 103A from reaching top detector 105A, but does not block light emitted by bottom emitter 103B from reaching top detector 105A. To reduce the interference between the bottom emitter 103B and the top detector 105A, and the interference between the top emitter 103A and the bottom detector 105B, the top emitter 103A and the bottom emitter 103B may be synchronized so that the bottom emitter 103B is off when top emitter 103A is on, and top emitter 103A is off when bottom emitter 103B is on.

Figure 2B:
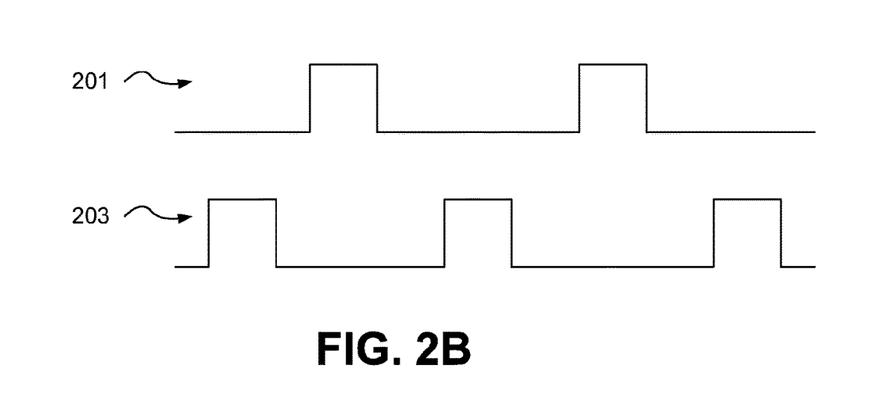
FIG. 2B illustrates a control scheme for controlling the top emitter and the bottom emitter according to an embodiment.

FIG. 2B illustrates a control scheme for controlling the top emitter 103A and the bottom emitter 103B according to one embodiment. Top emitter 103A is on when control waveform 201 is in an active state and off when control waveform 201 is in an inactive state. Bottom emitter 103B is on when control waveform 203 is in an active state and off when control waveform 203 is in an inactive state. As illustrated in FIG. 2B, control waveform 201 and control waveform 203 are never on at the same time.

The detector outputs may also be controlled by the control waveforms of the associated emitters. A detector is permitted to change state from inactive to active if that detector's emitter is active. When the control waveform reaches a falling edge of the control waveform, the detector is latched to its current output until the next rising edge of the control waveform. In this way, each emitter-detector pair does not interfere with another pair, even when the pairs are closely spaced together.

Figure 3A:
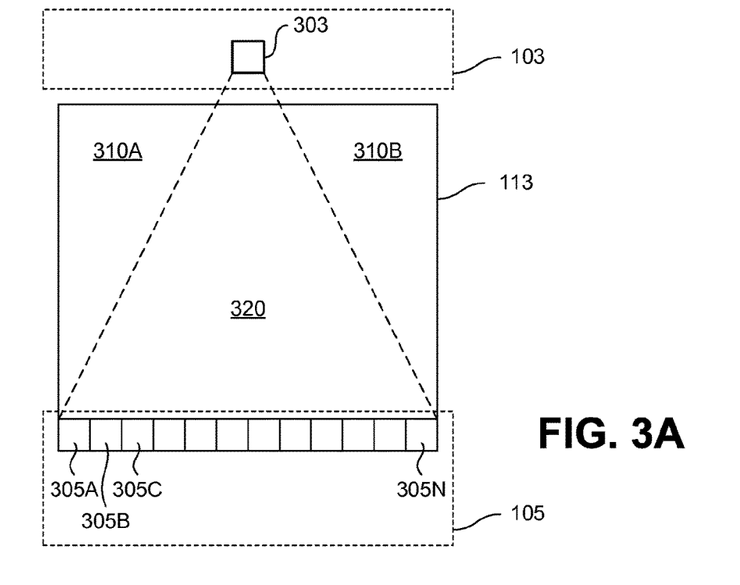
FIG. 3A through FIG. 3D are top views of an emitter and a detector, according to various embodiments.
Figure 3B:
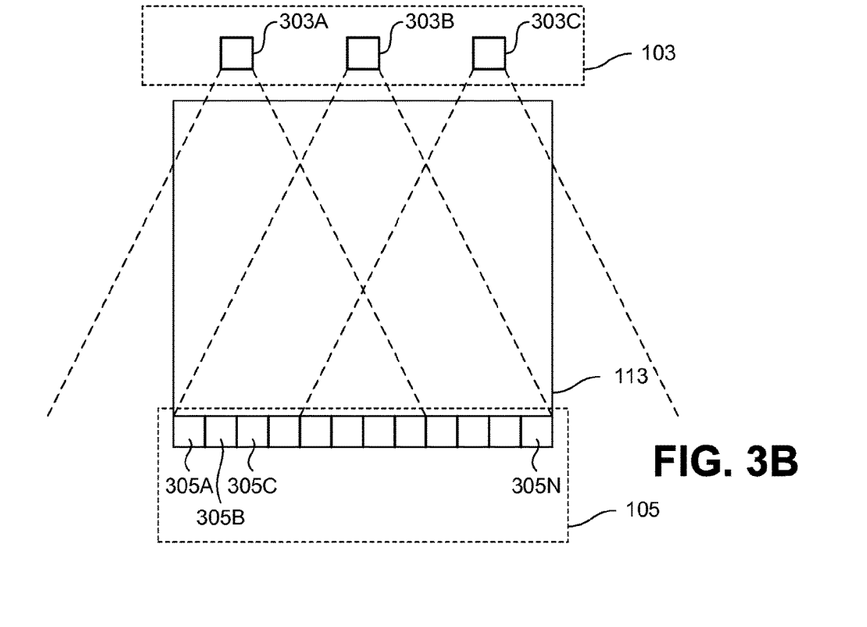
Figure 3C:
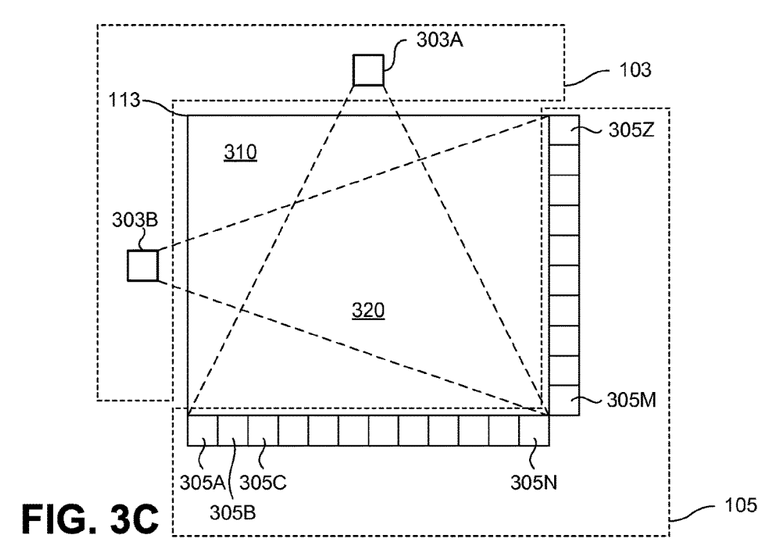
Figure 3D:
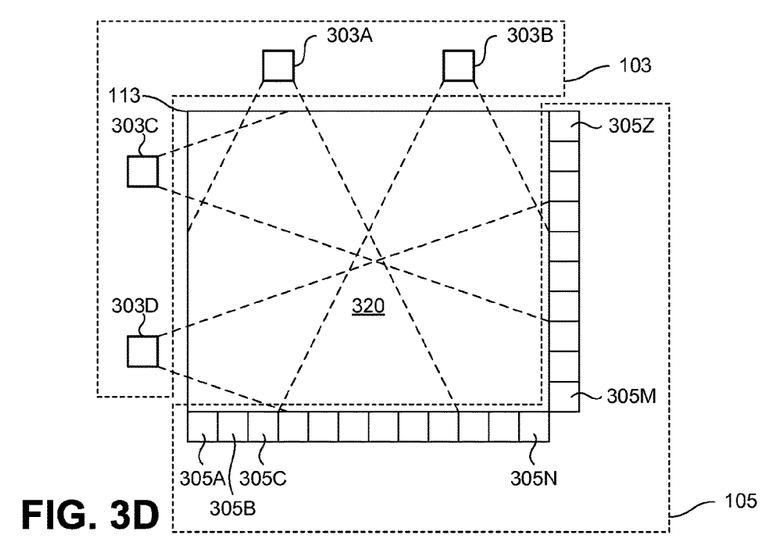

FIG. 3A though FIG. 3D are top views of an emitter 103 and a detector 105, according to one embodiment. Detector 105 includes a plurality of photodetectors 305. A photodetector 305 in one embodiment is a photodiode. A pill 101 may block a few detector cells and leave the other cells unblocked as the pill 101 passes in between the emitter 103 and the detector 105.

As shown in FIG. 3A, detector 105 may have blind spots 310. If a pill 101 passes though a blind spot 310, as the pill 101 travels through the pill verification system, the detector 105 will be unable to detect the pill 101. To reduce the likelihood of a pill being undetected by the detector 105, the emitter 103 may include multiple light sources 303. For example, the emitter of FIG. 3B includes three light sources 303A, 303B, and 303C. Moreover, as illustrated in FIG. 3C and FIG. 3D, the emitters may include light sources 303 arranged on two sides of the tube 113. The emitter of FIG. 3C includes one light source 303A on a first side of the tube 113 and one light source 303B on a second side of the tube 113. The emitter of FIG. 3D includes multiple light sources 303A, 303B on the first side of the tube 113 and multiple light sources 303C, 303D on the second side of the tube 113. In addition, the light sources 303 can be positioned farther away from the detector 105 or from the tube or pathway to minimize blind spots. In some embodiments, the light sources 303 are placed so that any blind spot the detector may have is smaller than the smallest object being detected by the detector 105.

Each light source 303 of emitter 103 may be turned on and off so that only one emitter is on at any given time. Alternatively, the light sources 303 of emitter 103 may be turned on and off so that light sources 303 from only one side of the tube 113 are on at any given time. For example, in FIG. 3D, light sources 303A and 303B are turned on when light sources 303C and 303D are turned off and light sources 303C and 303D are turned on when light sources 303A and 303B are turned off.

Figure 4:
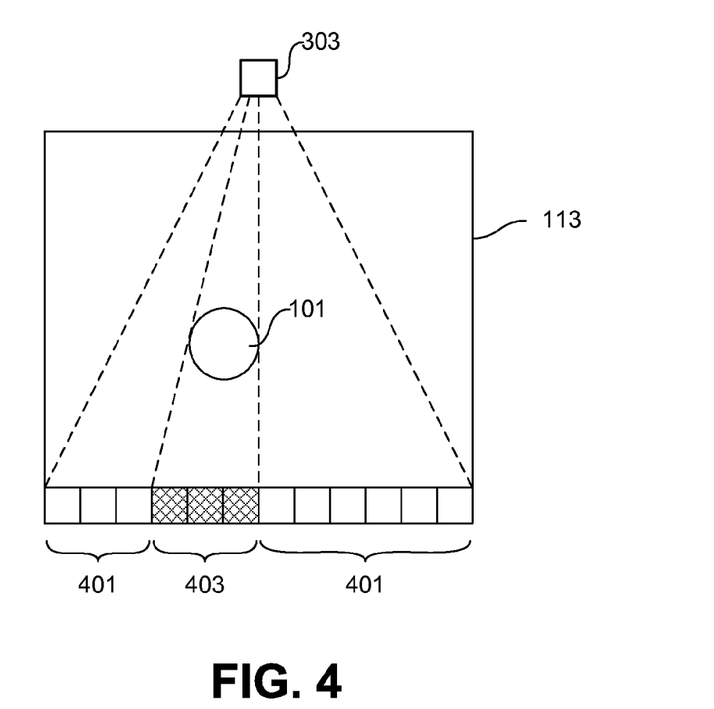
FIG. 4 illustrates a pill passing in between an emitter and a detector according to one embodiment.

FIG. 4 illustrates a pill 101 passing in between an emitter 103 and a detector 105 according to one embodiment. As the pill 101 passes in front of the detector 105, the pill 101 blocks the light emitted by a light source 303 from reaching the detector 105. As illustrated in FIG. 4, the pill 101 blocks three photodetectors 403. Depending on the position of the pill 101 when passing through the tube 113, the pill 101 may block more or fewer photodetectors 305. Detector 105 detects the presence of an object in between the detector 105 and the emitter 103 when at least one photodetector 305 is blocked by the object.

Figure 5A:
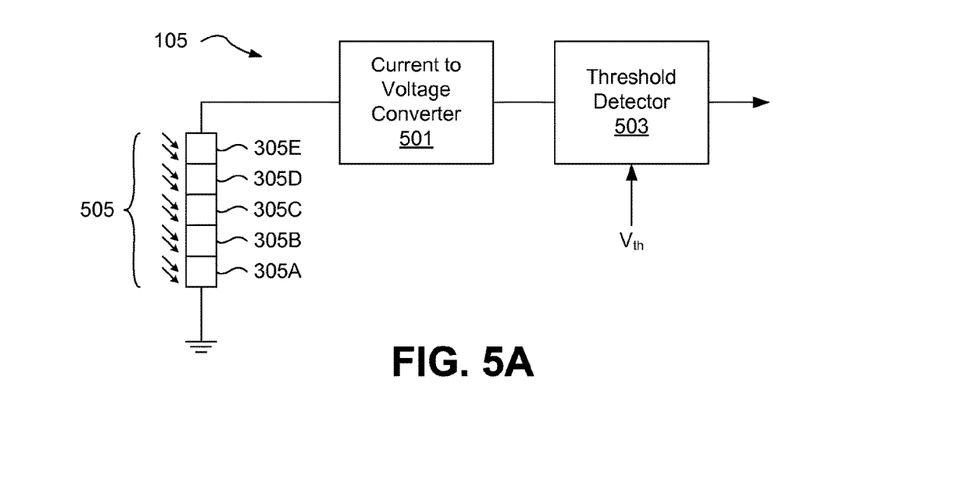
FIG. 5A illustrates a block diagram of a detector, according to an embodiment.
Figure 5B:
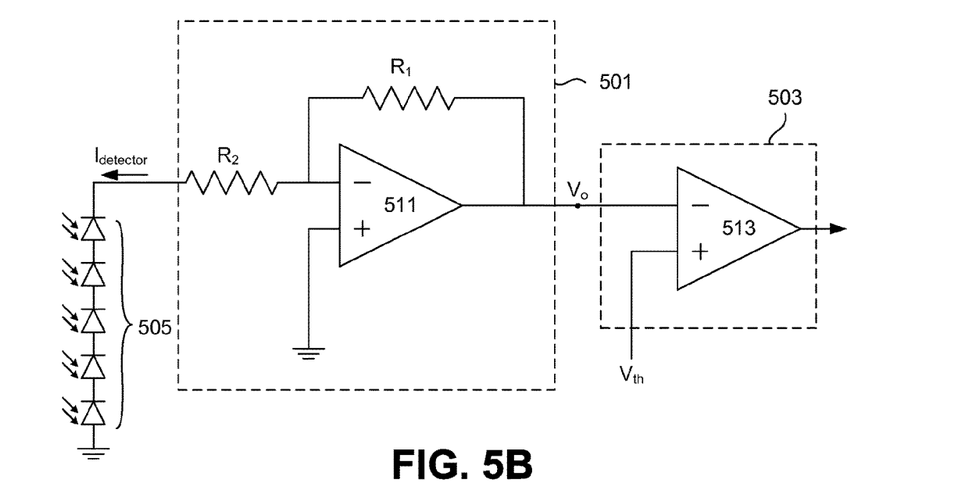
FIG. 5B illustrates a circuit diagram of a detector, according to an embodiment.

FIG. 5A illustrates a block diagram of a detector 105 and FIG. 5B illustrates a circuit diagram for the components of the detector 105. Detector 105 includes a photodetector array 505, a current-to-voltage converter 501 and a threshold detector 503. The photodetector array 505 includes a plurality of photodetectors 305 connected in series. Photodetectors 305 convert light into electrical current. If light is incident on all photodetectors 503, current flows through the photodetector array 505. Otherwise, if light is not incident on at least one photodetector 305 of the photodetector array 505, current flowing through the photodetector array 505 is reduced. In some embodiments, the amount of current that flows though the photodetector array 505 is based on the amount of light or the intensity of the light reaching each photodetector 305.

Current-to-voltage converter 501 receives the current generated by photodetector array 505 and generates a voltage level based on the received current. In the exemplary circuit diagram of FIG. 5B, current-to-voltage converter 501 includes a first resistor $R_1$, a second resistor $R_2$, and an operation amplifier (op-amp) 511. For instance, the output voltage $V_o$ of the current-to-voltage converter 501 may be calculated as:

$$V_o = R_1 \cdot I_{detector}$$

Threshold detector 503 receives the output voltage $V_o$, generated by current-to-voltage converter 501 and determines whether $V_o$ is above or below a threshold voltage $V_{th}$. In the exemplary circuit diagram of FIG. 5B, threshold detector 503 includes an op-amp 513. Op-amp 513 receives as a first input the output voltage $V_o$ of current-to-voltage converter 501 and as a second input a threshold voltage $V_{th}$. The op-amp 513 compares $V_o$ and $V_{th}$ and produces an output signal. If $V_o$ is larger than the threshold voltage $V_{th}$, the comparator 513 produces a signal in an inactive voltage level. Otherwise, if $V_o$ is smaller than the threshold voltage $V_{th}$, the comparator 513 produces a signal in an active voltage level. The threshold voltage $V_{th}$ is selected such that when the detector array 505 is unobscured by an object, the output voltage $V_o$ is larger than the threshold voltage $V_{th}$, but if a detector 503 is obscured or at least partially obscured, the output voltage $V_o$ is below the threshold voltage $V_{th}$.

By connecting the detectors in series, the current generated by the detector array 505 is affected when a pill passes any detector in the array. By measuring the current using a current-to-voltage converter 501 and a threshold voltage detector 503, any sufficient change in current $I_{detector}$ that reduces the voltage $V_o$ below the threshold is quickly registered as an output signal of the threshold detector 503. This permits the threshold detector 503 to output an indication of the passage of a pill based on the reduced current of any detector 305 in the detector array 505.

To take an image of the pill in motion, the pill verification system determines when the pill 101 will be in the field of view of the cameras 111. In some embodiments, the pill verification system determines when the pill 101 will be in the center of the field of view of the cameras 111. In one embodiment, the pill verification system determines whether two pills are too close to each other for the cameras 111 to be able to capture both pills.

In some embodiments, the pill verification system performs certain actions when the pill verification system determines that two pills are too close to each other to be able to capture satisfactory images of both pills. Two pills may be too close to each other if the time between the first pill is in field of view of the camera, and the second pill is in the field of view of the camera is shorter than the time it takes the camera to become ready to take a second picture.

In one embodiment, if the pill verification system determines that two pills are too close to each other, the pill verification system generates a signal identifying that an unverified pill passed through the pill verification system. In other embodiments, the pill verification system places the pills that were too close to each other for the camera 111 to take pictures of both pills in an unverified pills bin. The pills in the unverified pills bin may then be manually verified or run through the pill verification system for a second time.

The speed sensor 115 beneficially allows the pill verification system to determine when the pill 101 will be in the field of view of the cameras 111 by determining the speed of the pill 101 and the height of the pill 101. Since the photodetectors 305 in the photodetector array 505 of the speed sensor 115 are connected in series, the output of the photodetector array 505 can be obtained in real-time. Therefore, the speed sensor 115 reduces the lag time from between an object passes though the speed sensor 115 until the speed and height of the object is determined.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A pill imaging system comprising:
   a tube for receiving a pill and directing the pill from a receiving end through an imaging region of the tube;
   a first sensor positioned on the tube for detecting the pill, the first sensor comprising:
      a first emitter configured to emit light,
      a first plurality of photodetectors positioned across one side of the tube from the emitter to produce a signal based on an amount of light that is incident to the photodetectors, and
      a first detector coupled to the first plurality of photodetectors and generating a first detection signal indicating the presence of the pill when the signal produced by the first plurality of photodetectors indicates a reduction in the amount of light that is incident to any of the photodetectors;
   a second sensor positioned on the tube at a same distance from the receiving end of the tube as the first sensor, the second sensor comprising:
      a second emitter configured to emit light in a different direction from the first emitter, the second emitter positioned at the same distance from the receiving end of the tube as the first emitter, and
      a second plurality of photodetectors positioned across one side of the tube from the second emitter to produce a signal based on an amount of light that is incident to the photodetectors, and
      a second detector coupled to the second plurality of photodetectors and generating a second detection signal indicating the presence of the pill when the signal produced by the second plurality of photodetectors indicates a reduction in the amount of light that is incident to any of the photodetectors,
wherein the first emitter is configured to be off when the second emitter is on, and the second emitter is configured to be off when the first emitter is on, and
wherein the first detector signal of the first detector is latched when the first emitter is off, and the second detector signal of the second detector is latched when the second emitter is off;
a position detector coupled to the first and second sensor and outputting a position signal indicating when the pill is determined to be within the imaging region based on the first and second detection signal;
a camera positioned to capture one or more images of the pill within the tube at the imaging region of the tube; and
a camera controller coupled to the position detector, the camera controller actuating the camera when the pill is within the imaging location based on the position signal from the position detector.

2. The pill imaging system of claim 1 wherein the signal produced by the photodetectors is a current proportional to the amount of light that is incident to the photodetectors, and wherein the first detector further comprises:
a current-to-voltage converter configured to receive the current and generate a voltage proportional to the received current; and
a threshold detector configured to compare the voltage generated by the current-to-voltage converter and a threshold voltage, and generate the first detection signal based on the comparison.

3. The pill imaging system of claim 2, wherein the position detector is configured to:
determine at least one of speed, position, and length of the pill based on the first detection signal; and
determine an amount of time for the pill to be near the imaging region of the tube based on the determined speed, position and/or length of the pill.

4. The pill imaging system of claim 1, wherein the photodetectors are further configured to change the first detection signal responsive to a reduction in the amount of light incident on any of the photodetectors in the first plurality of photodetectors.

5. The pill imaging system of claim 1, wherein the photodetectors are photodiodes and wherein the first emitter is a light emitting diode.

6. A system for determining the presence of an object comprising:
a first sensor comprising:
an emitter configured to emit light;
a photodetector array comprising a plurality of photodetectors connected in series, the photodetector array configured to produce a current proportional to an amount of light that is incident to the each of the photodetectors in the photodetector array, the photodetector array including at least a first photodetector and a second photodetector, the first and second photodetectors configured to conduct current when light emitted by the emitter is incident on the first and second photodetectors, wherein an anode of the first photodetector is connected to a cathode of the second photodetector; and
a detector coupled to the photodetector array configured to detect the light emitted by the emitter and detect the presence of the object at a location, the detector comprising:
a current-to-voltage converter configured to receive a current set by the photodetector array and generate a voltage proportional to the received current; and
a threshold detector configured to compare the voltage generated by the current-to-voltage converter and a threshold voltage and output an indication of the presence of the object based on the comparison.

7. The system of claim 6, wherein the photodetector array is further configured to decrease the current responsive to the amount of light incident to at least one of the photodetectors being reduced.

8. The system of claim 6, further comprising a second sensor comprising an emitter, a photodetector array and a detector, wherein the emitter of the first sensor and the emitter of the second sensor alternately turn on and off the emitter of the first sensor is configured to turn off when the emitter of the second sensor is on, and the emitter of the second sensor is configured to turn off when the emitter of the first sensor is on.

9. The system of claim 6, wherein the photodetectors are photodiodes.

10. The system of claim 6, wherein the emitter is a light emitting diode (LED).

11. The system of claim 6, wherein the current-to-voltage converter comprises:
an operational amplifier, the operation amplifier comprising an output, a non-inverting input, and an inverting input;
a first resistor comprising a first terminal and a second terminal, the first terminal of the first resistor coupled to the inverting input of the operational amplifier and the second terminal of the first resistor coupled to the output of the operational amplifier; and
a second resistor coupled to the inverting input of the operational amplifier.

12. A method for determining the presence of an object, the method comprising:
detecting light using a photodetector array, the photodetector array comprising a plurality of photodetectors connected in series, the photodetector array configured to generate a current proportional to an amount of light that is being detected by each photodetector in the photodetector array, the photodetector array including at least a first photodetector and a second photodetector, the first and second photodetectors configured to conduct current when light emitted by an emitter is incident on the first and second photodetectors, wherein an anode of the first photodetector is connected to a cathode of the second photodetector;
converting the current generated by the photodetector array into a detector voltage; and
determining the presence of the object at a location responsive to determining that the detector voltage is below a threshold.

13. The method of claim 12, further comprising:
detecting light using a second photodetector array, the second photodetector array configured to generate a second current proportional to a second amount of light that is being detected by photodetector in the second photodetector array;
converting the second current generated by the second photodetector array into a second detector voltage;
determining whether the second detector voltage is below the threshold; and determining an amount of time elapsed since the determination that the detector voltage is below the threshold until the determination that the second detector voltage is below the threshold.

14. The method of claim 13, further comprising determining a velocity of the object based on the determined amount of time and a distance between the photodetector array and the second photodetector array.

15. The method of claim 12, further comprising:
determining an amount of time elapsed since the determination that the detector voltage is below the threshold until a determination that the detector voltage is above the threshold; and
determining a height of the object based on the determined amount of time.

16. The method of claim 12, wherein the detector voltage decreases when the object passes in front of the photodetector array.

17. The method of claim 12, wherein the photodetectors are photodiodes.

18. The method of claim 12, wherein the light detected by the photodetector is generated using a light emitting diode (LED).

19. The pill imaging system of claim 1, wherein the first emitter of the first sensor and the second emitter of the second sensor are configured to turn on and off with a same frequency.

* * * * *